G. LEEPER.
SPRING WHEEL.
APPLICATION FILED MAR. 25, 1910.
992,719.
Patented May 16, 1911.
2 SHEETS—SHEET 1.
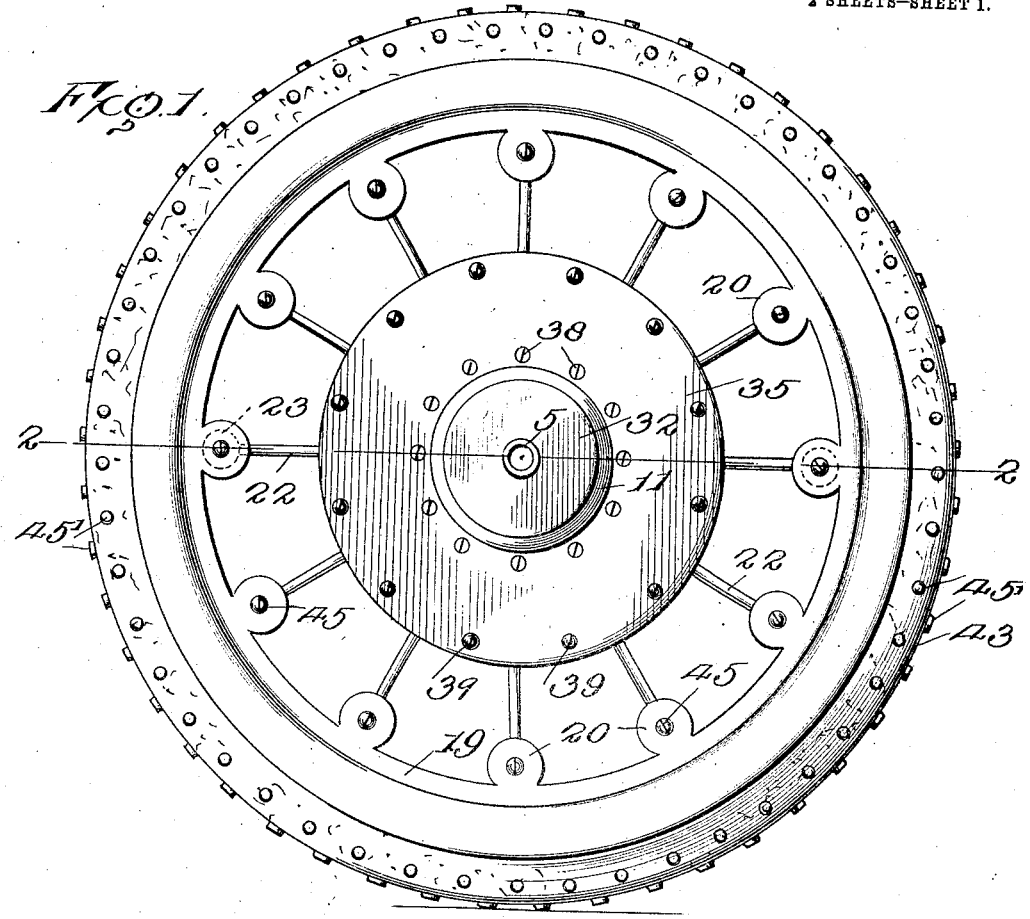
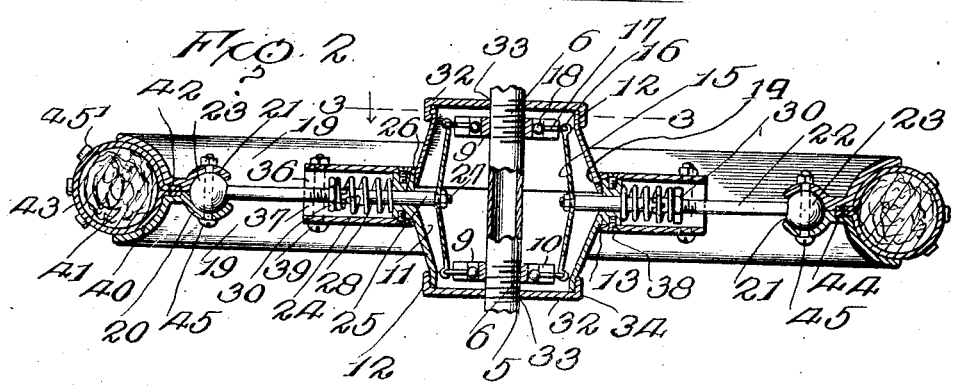
Witnesses
Inventor
Grant Leeper
By
............, Attorneys G. LEEPER.
SPRING WHEEL.
APPLICATION FILED MAR. 25, 1910.
992,719.
Patented May 16, 1911.
2 SHEETS—SHEET 2.
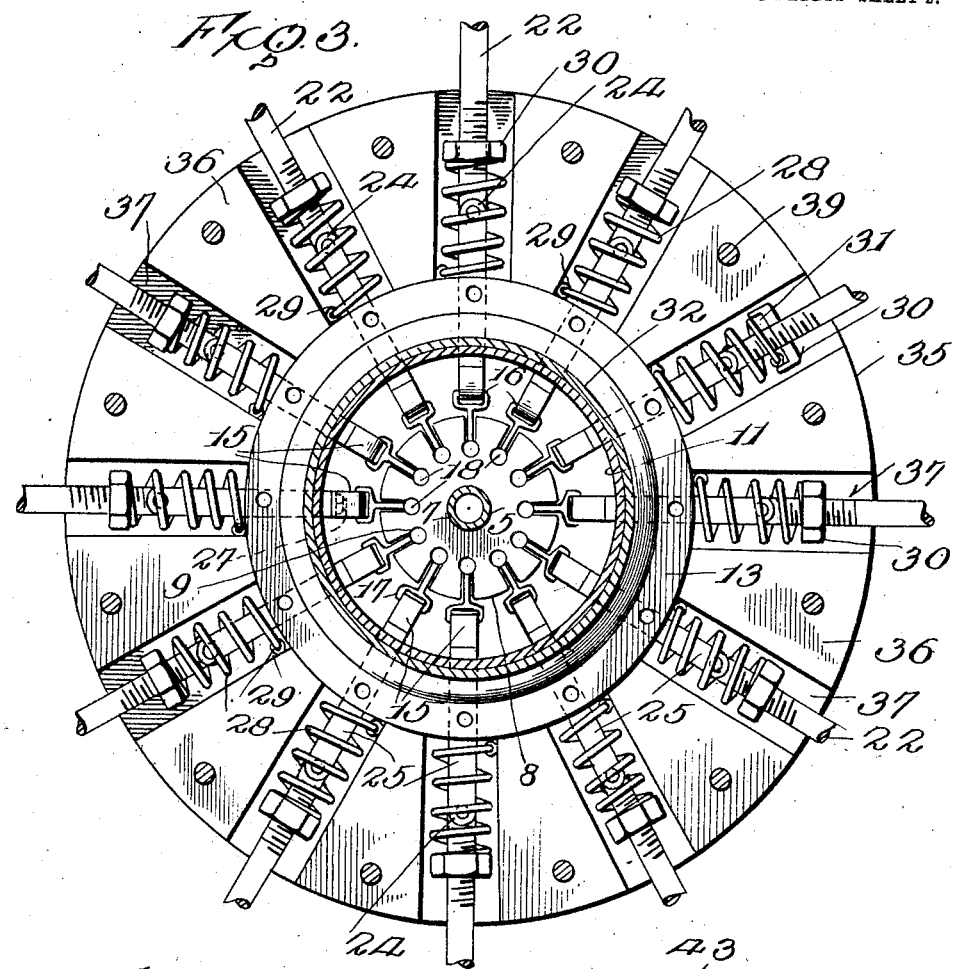
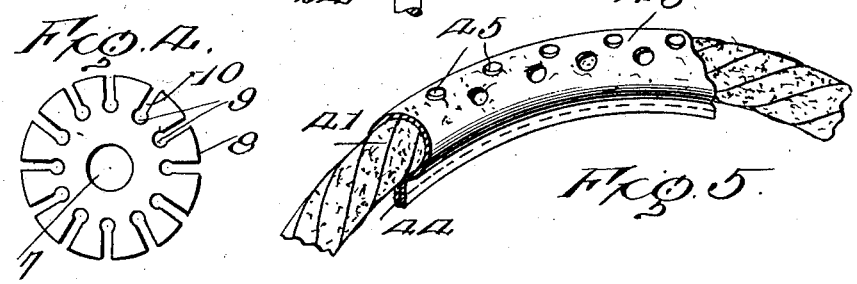
Witnesses
Inventor
Grant Leeper
By
Attorney

UNITED STATES PATENT OFFICE.

GRANT LEEPER, OF VISALIA, CALIFORNIA.

SPRING-WHEEL.

992,719.

Specification of Letters Patent.   Patented May 16, 1911.

Application filed March 25, 1910.  Serial No. 551,524.

*To all whom it may concern:*

Be it known that I, GRANT LEEPER, citizen of the United States, residing at Visalia, in the county of Tulare and State of California, have invented certain new and useful Improvements in Spring-Wheels, of which the following is a specification.

This invention relates to vehicle wheels and has for its object the provision of a spring wheel, the construction of which is such as positively to prevent jolting or jarring of the felly and its associated parts incident to traveling over rough, uneven roads.

A further object is to provide a spring wheel including pivotally united inner and outer spokes for connection with the hub and felly, respectively, said felly or rim being provided with a circumferential seating recess for the reception of a tire.

A further object is to form the hub of the wheel in two sections, one of which is provided with spaced flanges adapted to support a series of flat springs to which are connected the inner spokes of the wheel, there being coil springs secured to the outer spokes and outer hub section respectively, and forming a cushion for said spokes.

A further object is to provide a ball and socket connection between the spokes and the rim of the wheel, and means piercing the sockets and the adjacent ends of the spokes for clamping the tire to its seat on the rim.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a side elevation of a spring wheel constructed in accordance with my invention; Fig. 2 is a cross sectional view taken on the line 2—2 of Fig. 1; Fig. 3 is an enlarged detail vertical sectional view taken on the line 3—3 of Fig. 2 and looking in the direction of the arrow one of the side plates or disks being removed. Fig. 4 is an end view of the hub section; Fig. 5 is a detail perspective view of a portion of the tire, the covering being broken away to expose the fibrous filling.

Corresponding and like parts are referred to in the following description and indicated in all the views of the drawings by the same reference characters.

The improved spring wheel forming the subject matter of the present invention comprises a hub formed of inner and outer sections, the inner hub section 5 having its opposite ends threaded at 6 and provided with a longitudinally disposed bore 7 for the reception of the axle. Secured to or formed integral with the inner hub section 5 are spaced circumferential flanges 8 having cylindrical sockets 9 formed therein and a series of radiating recesses 10 communicating with said sockets and opening through the peripheral edges of the flanges 8, as shown.

The outer hub section 11 is preferably formed in two parts, each having its outer end threaded at 12, one of said sections being provided with an integral reinforcing rib 13 having interior threads 14 for engagement with the correspondingly threaded end of the adjacent outer hub section so that said outer hub sections may be quickly assembled and readily detached so as to expose the interior mechanism of the hub when necessary.

Interposed between the inner and outer hub sections are a plurality of flat springs 15 having their opposite ends inclined inwardly in the direction of the adjacent flanges 8. Pivotally connected at 16 to the opposite ends of the flat springs 15, are links 17 having spherical heads 18 adapted to enter the sockets 9 in the flanges 8, thus to hold the springs 15 in position on said flanges, while at the same time allowing a limited longitudinal movement of the springs on said flanges incident to the expansion and contraction of said springs.

Surrounding the hub is a rim or felly 19 having a plurality of spaced depending ears 20 formed integral therewith and provided with hemispherical depressions or recesses 21 adapted to register with each other to form sockets for the reception of the adjacent ends of the outer spoke sections 22. The outer ends of the spokes 22 are provided with spherical heads 23 adapted to enter the sockets 21, while the inner ends of said spokes are pivotally connected at 24 to inner spoke sections 25. The inner spoke sections 25 extend through openings 26 formed in the reinforcing rib 13 and also through corresponding openings in the adjacent flat springs 15, said inner spokes being provided with terminal threads for engagement with clamping nuts 27, which latter bear against the adjacent faces of the springs 15 and serve to rigidly secure the inner spokes in position thereon.

Surrounding the spoke sections 22 and 25 are coil springs 28, each having one end thereof secured to an eye 29 on the reinforcing rib 13 and its other end bearing against a nut 30 on the adjacent outer spoke 22, as shown. The nuts 30 are threaded on the outer spokes 22 and are provided with depressions 31 which receive the springs 28 so that by rotating the nuts on the threaded portions of the outer spokes 22, the tension of the springs 28 may be regulated so as to vary the resiliency of the wheel.

Disposed at the opposite ends of the hub are detachable caps 32, each having a threaded opening 33 formed therein for engagement with the threaded end 6 of the inner hub section 5 and provided with an inwardly extending flange 34 having its inner face threaded for engagement with the terminal threads 12 on the outer hub section, thus to hold the inner and outer hub sections in assembled position and also to prevent accidental displacement of the links 17.

Surrounding the hub of the wheel is a casing or housing, preferably formed of oppositely disposed plates or disks 35, one of which is provided with radiating lugs 36 spaced apart to form openings 37 for the reception of the outer spokes 22, said lugs 36 serving to maintain the plates 35 in proper relation to each other and thus allow a slight lateral movement of the spokes 22 within the recesses 37 when the wheel is in motion. Bolts or similar fastening devices 38 pierce the plates 35 and engage the reinforcing rib 13, there being similar fastening devices 39 connecting one of the plates with the adjacent lugs 36, as shown.

The plates 35 not only serve to reinforce and strengthen the wheel, but also form a housing and protection for the springs 28.

The rim or felly 19 is provided with a U-shaped seating recess 40 adapted to receive the tire 41, the inner faces of the sections forming the rim or felly 19 being spaced apart, as indicated at 42. The tire 41 is preferably formed of a single length of Manila rope, flax, jute, hemp or other fibrous material, so as to form a yieldable tread surface without danger of puncture. The fibrous filling 41 is covered by a strip of leather, rubber or similar material 43, the adjacent longitudinal edges of which are brought together and sewed or otherwise united to form a circumferential lip 44 adapted to fit into the recess 42.

Bolts or similar fastening devices 45 extend through the sockets 21 and heads 23 of the inner spokes and serve to clamp the sections comprising the rim or felly in engagement with the lip 44, thus to prevent accidental displacement of the tire.

Attention is here called to the fact that the fastening devices 45 not only form a pivotal connection between the rim of the wheel and the outer spokes 22, but also serve to clamp the sections comprising the rim in engagement with the tire.

Thus it will be seen that the weight of the load on the spokes will cause the latter to depress the leaf springs 15, the ball and socket connection between the links 17 and flanges 8 permitting a slight movement of the springs relative to said flanges. Should the weight of the load be excessive the springs 18 will come into play and thus assist in preventing undue strain on the felly and its associated parts incident to traveling over rough, uneven roads.

If desired, the covering 43 may be provided with metal rivets or projections 45 to prevent skidding and also to prevent excessive wear on the tire.

The wheel is extremely simple in construction and will be found admirably adapted for the attainment of the ends in view.

Having thus described the invention, what is claimed as new is:

1. A vehicle wheel including inner and outer hub sections, one of which is provided with spaced circumferential flanges, flat springs interposed between said hub sections, a ball and socket connection between each spring and the adjacent flanges, a rim, and spokes forming a connection between the rim and springs.

2. A vehicle wheel including inner and outer hub sections, one of which is provided with spaced circumferential flanges having sockets formed therein, flat springs interposed between said hub sections, links pivotally mounted on the springs and engaging the sockets in the flanges, a rim, and spokes connecting the rim and said springs.

3. A vehicle wheel including inner and outer hub sections, one of which is provided with spaced circumferential flanges and the other with a reinforcing rib, flat springs interposed between the hub sections, a pivotal connection between each spring and the adjacent flange, a rim, and sectional spokes forming a connection between the rim and adjacent springs, said spokes extending through the reinforcing rib of the outer hub section.

4. A vehicle wheel including inner and outer hub sections, one of which is provided with spaced circumferential flanges, flat springs interposed between the inner and outer hub sections, a pivotal connection between each spring and the adjacent flange, a rim, inner and outer spokes having their adjacent ends pivotally united, a pivotal connection between the outer end of each outer spoke and the rim, the inner end of each inner spoke being provided with means for engagement with the adjacent flat spring, and caps forming closures for the opposite ends of the hub and provided with means for detachable connection with the adjacent hub sections.

5. A vehicle wheel including inner and outer hub sections, one of which is provided with spaced circumferential flanges, flat springs surrounding said flanges, a rim, spokes connecting the rim and springs, coil springs surrounding said spokes and bearing against the outer hub section, and means for regulating the tension of the coil springs.

6. A vehicle wheel including inner and outer hub sections, one of which is provided with spaced circumferential flanges, flat springs interposed between said hub sections, the outer hub section being formed in two parts having their adjacent edges threaded, one of the parts of the outer hub section being provided with a reinforcing rib, a rim, sectional spokes extending through the reinforcing rib and forming a connection between the springs and rim, the outer section of each spoke being threaded, coil springs surrounding the spokes, nuts engaging the threaded outlet sections of the spokes and bearing against the coil springs, and caps forming closures for the opposite ends of the hub.

7. A vehicle wheel including inner and outer hub sections, one of which is provided with spaced circumferential flanges, flat springs interposed between the hub sections, a rim, sectional spokes forming a connection between the flat springs and the rim of the wheel, adjusting collars carried by the spokes, coil springs interposed between the adjusting collars and outer hub section, caps forming closures for the opposite ends of the hub, and spaced plates secured to the outer hub section and forming a housing for the coil springs.

8. A vehicle wheel including inner and outer hub sections, having their opposite ends threaded, one of said hub sections being provided with spaced circumferential flanges, flat springs interposed between the hub sections and having their opposite ends inclined in the direction of the adjacent flanges, a ball and socket connection between each flat spring and the adjacent flange, caps having threaded portions for engagement with the threaded portions of the hub sections, a rim, pivotally connected spokes forming a connection between the rim and flat springs, the outer hub section being provided with a circumferential reinforcing rib having openings formed therein for the reception of the adjacent spoke sections, adjustable collars carried by some of the spoke sections, coil springs interposed between the collars and the outer hub section, and guard plates engaging the reinforcing rib of the outer hub section and forming a housing for the coil springs.

In testimony whereof I affix my signature in presence of two witnesses.

GRANT LEEPER. [L. S.]

Witnesses:
  D. G. OVERALL,
  A. F. BROWN.